US012749853B2

(12) United States Patent
Xu et al.

(10) Patent No.: US 12,749,853 B2
(45) Date of Patent: Sep. 29, 2026

(54) CONNECTOR, CONNECTOR ASSEMBLY, AND ELECTRONIC DEVICE

(71) Applicant: HUAWEI TECHNOLOGIES CO., LTD., Shenzhen (CN)

(72) Inventors: Kou Xu, Dongguan (CN); Yaohua Tian, Dongguan (CN); Zewen Wang, Shenzhen (CN); Xiangqian Lu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 18/424,995

(22) Filed: Jan. 29, 2024

(65) Prior Publication Data

US 2024/0170893 A1 May 23, 2024

Related U.S. Application Data

(63) Continuation of application No. PCT/CN2022/107711, filed on Jul. 25, 2022.

(30) Foreign Application Priority Data

Jul. 30, 2021 (CN) ......................... 202110872464.1

(51) Int. Cl.
*H01R 13/6461* (2011.01)
*H01R 12/73* (2011.01)

(52) U.S. Cl.
CPC ......... *H01R 13/6461* (2013.01); *H01R 12/73* (2013.01)

(58) Field of Classification Search
CPC ............................ H01R 13/6461; H01R 12/73
(Continued)

(56) References Cited

U.S. PATENT DOCUMENTS 8,491,340 B2 * 7/2013 Sass ..................... H01R 12/722 439/636
11,742,621 B2 * 8/2023 Lin .................... H01R 13/6594 439/607.11
2016/0043484 A1 * 2/2016 Brodsky ................ H05K 3/366 439/65

FOREIGN PATENT DOCUMENTS

| | | |
|---|---|---|
| CN | 102623852 B | 10/2015 |
| CN | 112134097 A | 12/2020 |
| TW | M608891 U | 3/2021 |

OTHER PUBLICATIONS

International Search Report and Written Opinion issued in PCT/CN2022/107711, dated Oct. 9, 2022, 9 pages.

(Continued)

*Primary Examiner* — Gary F Paumen

(57) ABSTRACT

A ground conductive assembly includes a conductive housing and a first ground terminal. The conductive housing is provided with a first cavity and a second cavity. The conductive housing includes a first end and a second end that are opposite to each other in a first direction. The first end of the conductive housing is configured to be connected to a peer connector. The first ground terminal is disposed at the first end of the conductive housing, extends into the second cavity, and is electrically connected to an inner wall of the second cavity. The lead frame is disposed at the second end of the conductive housing. The lead frame includes a plurality of signal terminal groups and shield layers arranged on two sides of the plurality of signal terminal groups. A ground return path of the connector is significantly shortened, and a transmission rate is improved.

16 Claims, 12 Drawing Sheets

(58) Field of Classification Search
USPC .................................................... 439/65, 108
See application file for complete search history.

(56) References Cited

OTHER PUBLICATIONS

European Extended Search Report for Application No. 22848497 dated Sep. 2, 2024, 27 pages.

* cited by examiner

CONNECTOR, CONNECTOR ASSEMBLY, AND ELECTRONIC DEVICE

CROSS-REFERENCE TO RELATED APPLICATIONS

This application is a continuation of International Application No. PCT/CN2022/107711, filed on Jul. 25, 2022, which claims priority to Chinese Patent Application No. 202110872464.1, filed on Jul. 30, 2021. The disclosures of the aforementioned applications are hereby incorporated by reference in their entireties.

TECHNICAL FIELD

This disclosure relates to the field of connector technologies, and in particular, to a connector, a connector assembly, and an electronic device.

BACKGROUND

With popularization of big data transmission applications such as video applications and shopping applications, the market has increasing requirements for data exchange. Information and communications technology (ICT) products, used as a support for data transmission, continuously develop into products with a large capacity and a high rate. A transmission rate of a high-speed connector, used as a key component of board-level data exchange in an ICT product architecture, is a key to affect an entire ICT product.

From a perspective of iteration of a rate upgrade solution of a connector, how to reliably implement isolation between a high-speed differential pair at low costs has always been a prominent problem in development of high-speed devices. In particular, after a rate of a product reaches 25 G, how to implement full-link isolation between a differential pair becomes a strong technical requirement.

At present, from a perspective of solutions in the industry, designs of a plurality of types of products all can implement full shielding in the high-speed connector. This is no longer the biggest bottleneck at present. However, how to implement board-to-board full-link ground isolation of a signal differential pair in the high-speed connector, and implement the shortest ground return of each reference ground have become key affecting a transmission rate.

SUMMARY

This disclosure provides a connector, a connector assembly, and an electronic device, to improve a ground return path of the connector and improve a transmission rate.

According to a first aspect, this disclosure provides a connector. The connector includes a ground conductive assembly and a lead frame. The ground conductive assembly is configured to improve a length of a ground return path. The ground conductive assembly includes a conductive housing and a first ground terminal. The conductive housing is provided with a first cavity and a second cavity. The conductive housing includes a first end and a second end that are opposite to each other in a first direction. The first end of the conductive housing is configured to be connected to a peer connector. The first ground terminal is disposed at the first end of the conductive housing, extends into the second cavity, and is electrically connected to an inner wall of the second cavity. The first direction is an insertion direction of the connector and the peer connector. During assembly, the lead frame is disposed at the second end of the conductive housing. The lead frame includes a plurality of signal terminal groups and shield layers arranged on two sides of the plurality of signal terminal groups. The signal terminal group includes at least one signal terminal. The shield layer is electrically connected to the conductive housing, so that the first ground terminal is electrically connected to the shield layer through the conductive housing. The signal terminal extends into the first cavity and is isolated from an inner wall of the first cavity, that is, electrically isolated from the conductive housing, to avoid affecting signal transmission.

In a technical solution provided in this disclosure, when the connector is connected to a circuit board, the shield layer is electrically connected to a ground layer of the circuit board. The shield layer is used as a reference ground of the connector. Because the conductive housing is electrically connected to the shield layer, the conductive housing may be used as a reference ground of the connector. The first ground terminal is disposed in the conductive housing and is electrically connected to the conductive housing. When the connector is fitted with the peer connector, the first ground terminal is electrically connected to a second ground terminal of the peer connector to implement grounding. Compared with a case in which the shield layer of the connector used in the conventional technology is electrically connected to the second ground terminal of the peer connector to implement grounding, a ground return path (the second ground terminal—the first ground terminal—the conductive housing) used when the connector provided in this disclosure is used is shorter than a ground return path (the second ground terminal—the shield layer) used when the connector in the conventional technology is used. Therefore, the connector provided in this disclosure can effectively improve the ground return path of the connector, and improve a transmission rate of the connector.

In a specific implementable solution, the first ground terminal includes a support plate. The support plate is located in the second cavity and is disposed close to the first end of the conductive housing. A protrusion is provided on one side of the support plate. The protrusion is configured to abut against the second ground terminal of the peer connector. Fitting with the second ground terminal is implemented by using a structure in which the support plate and the protrusion are cooperated, so that the fitting is stable, and the structure is simple.

When the support plate is disposed, one side that is of the support plate and that is away from the protrusion is connected to the inner wall of the second cavity. An electrical connection between the first ground terminal and the conductive housing is implemented through the support plate, so that a connection area is large, and the connection is stable.

In a specific implementable solution, the first ground terminal includes a support plate and an elastic arm. The support plate is located in the second cavity and is disposed close to the first end of the conductive housing. The elastic arm is disposed on one side of the support plate, and the elastic arm is configured to abut against a second ground terminal of the peer connector. Fitting with the second ground terminal is implemented by using a structure in which the support plate and the elastic arm are cooperated. The structure is simple, assembly is convenient, and insertion fitting between connectors is convenient.

When the support plate is disposed, one side that is of the support plate and that is away from the elastic arm is connected to the inner wall of the second cavity. An electrical connection between the first ground terminal and the conductive housing is implemented through the support plate, so that a connection area is large, and connection stability is high.

In a specific implementable solution, the second cavity accommodates two first ground terminals. Elastic arms of the two first ground terminals are disposed opposite to each other, and the elastic arms of the two first ground terminals are configured to clamp the second ground terminal of the peer connector. The two first ground terminals are together fitted with the second ground terminal of the peer connector, to improve abutment strength and stability and improve a grounding effect.

When the two first ground terminals that are used in pairs are disposed, the elastic arms of the two first ground terminals located in a same second cavity are in contact with each other or have a gap. Elastic arms of a pair of first ground terminals may clamp the second ground terminal when the second ground terminal is connected to the second cavity, to improve connection stability.

When the first ground terminal is disposed, the first ground terminal includes a plurality of elastic arms that are disposed in parallel. The plurality of elastic arms together abut against the second ground terminal of the peer connector, so that a connection is stable, and an electrical connection effect is improved.

In a specific implementable solution, there are a plurality of first ground terminals, and each first ground terminal includes a support plate and an elastic arm. The support plate is connected to the first end of the conductive housing, and support plates of the plurality of first ground terminals are connected to form an integrated structure. The elastic arm is connected to one side of the support plate, and the elastic arm is configured to abut against a second ground terminal of the peer connector. The plurality of first ground terminals are connected to each other to form the integrated structure, to facilitate assembly.

When the support plate is disposed, one side that is of the support plate and that is connected to the elastic arm faces the conductive housing, and the elastic arm extends into the second cavity. An electrical connection between the first ground terminal and the conductive housing is implemented through the support plate, so that a connection area is large, and connection stability is high. In addition, the elastic arm extends into the second cavity, and space occupied by the first ground terminal is small.

When the support plate is disposed, a window is disposed on the support plate, and the window is at a position that is in the first direction and that corresponds to the second cavity. The window is disposed to facilitate insertion of the second ground terminal of the peer connector into the second cavity.

When the first ground terminal is disposed, the first ground terminal includes a plurality of elastic arms, and the plurality of elastic arms are disposed in parallel or opposite to each other. The plurality of elastic arms together abut against the second ground terminal of the peer connector, so that a connection is stable, and an electrical connection effect is improved.

When the first ground terminal is disposed, one end that is of the elastic arm and that is configured to abut against the second ground terminal of the peer connector is disposed close to the first end of the conductive housing. The ground return path is further shortened, and crosstalk between signals of the connector is improved.

In a specific implementable solution, the first cavity penetrates through the conductive housing in the first direction. This facilitates a connection between the signal terminal and a signal terminal of the peer connector.

In a specific implementable solution, the second cavity penetrates through the conductive housing in the first direction, or the second cavity is provided with an opening that corresponds to the first end of the conductive housing. This facilitates a connection between the first ground terminal and the second ground terminal of the peer connector.

In a specific implementable solution, the connector further includes an insulation housing. The insulation housing is provided with a mounting slot. The first end of the conductive housing is disposed in the mounting slot. The insulation housing is used as a connection member to integrate the conductive housing and the lead frame, to improve structure stability of the connector.

When the insulation housing is disposed, an insulation sleeve is disposed on one side that is of the mounting slot and that faces the first end of the conductive housing. The insulation sleeve extends into the first cavity and sleeves the signal terminal. The insulation housing is sleeved outside the signal terminal, so that the signal terminal is insulated from the conductive housing, and stability of electrical isolation between the signal terminal and the conductive housing is improved.

According to a second aspect, this disclosure provides a connector assembly. The connector assembly includes the foregoing connector and a peer connector. The connector may be electrically connected to the peer connector through insertion. A ground return path used when the connector assembly provided in this disclosure is used is shorter than a ground return path used when the connector in the conventional technology is used. Therefore, the connector assembly provided in this disclosure may effectively improve the ground return path of the connector, and a data transmission rate between a circuit board and the connector is improved.

According to a third aspect, this disclosure provides an electronic device. The electronic device includes a first circuit board, a second circuit board, and the foregoing connector assembly. A connector is disposed on the first circuit board and is electrically connected to the first circuit board. A peer connector is disposed on the second circuit board and is electrically connected to the second circuit board. The connector provided in this disclosure is used, so that an inter-board data transmission rate is improved, and SI performance of crosstalk and the like between signals of the connector is significantly improved.

DESCRIPTION OF EMBODIMENTS

For ease of understanding a connector provided in embodiments of this disclosure, the following describes several terms related to the connector.

Shield layer: The shield layer is an entire metal sheet, requires a ground signal, and has an electromagnetic shielding effect.

Signal terminal: The signal terminal is a metal lead used to transmit a signal or provide a return path for a signal.

Lead frame: The lead frame is a main structure including a signal terminal, a shield conductor, and an insulator.

Crosstalk: The crosstalk is a coupling effect that generates harmful electrical signal interference when a harmful signal is transferred from one network to another network. Crosstalk in this disclosure is crosstalk between different signal terminal groups.

Figure 1:
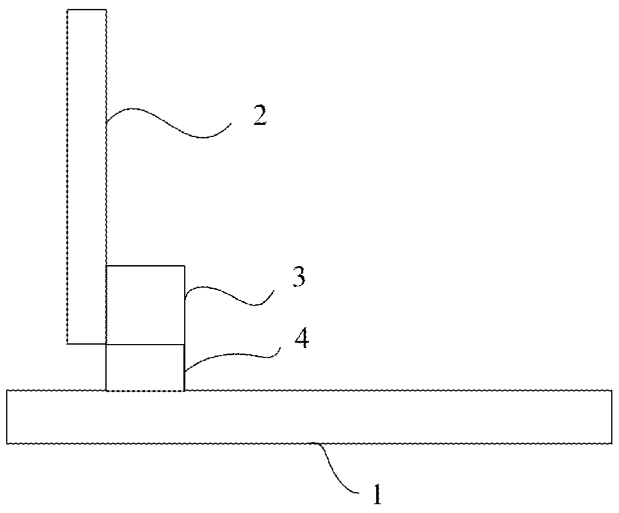
FIG. 1 is a possible connection manner of a connector according to an embodiment of this disclosure during actual application.
Figure 2:
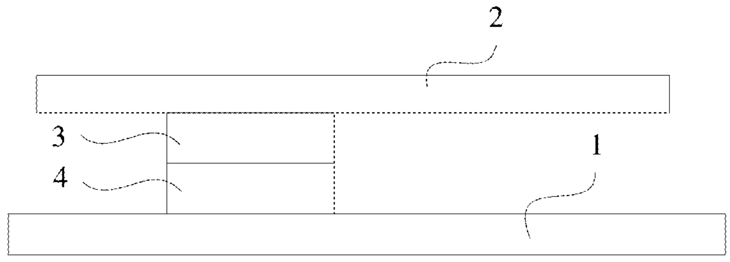
FIG. 2 is another possible connection manner of a connector according to an embodiment of this disclosure during actual application.
Figure 3:
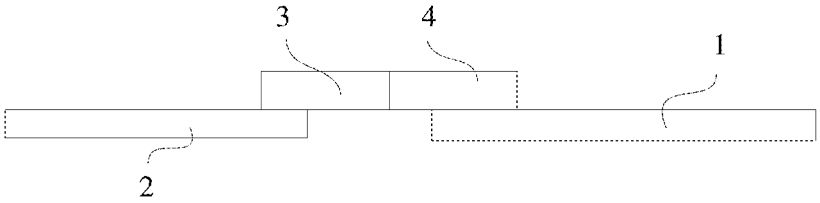
FIG. 3 is still another possible connection manner of a connector according to an embodiment of this disclosure during actual application.

First, an application scenario of a connector provided in embodiments of this disclosure is described. The connector provided in embodiments of this disclosure may be used in an electronic device. The electronic device may be a communications device, a server, a supercomputer or a router, a switch, or the like in the conventional technology. The communications device may include a first circuit board and a second circuit board. For example, the first circuit board may be a backboard, and the second circuit board may be a sub-board. Refer to FIG. 1. A connector provided in this embodiment of this disclosure is used in an electronic device. A backboard 1 and a sub-board 2 of the electronic device may be vertically connected. As shown in FIG. 1, a first connector 4 is disposed on the backboard 1, and a second connector 3 is disposed on the sub-board 2. The connector provided in this embodiment of this disclosure may be used as one of the first connector 4 and the second connector 3, and is in insertion fitting with the other connector to form a connector assembly in which the two connectors are electrically connected to each other. When the backboard 1 and the sub-board 2 are connected, the first connector 4 and the second connector 3 may be fitted to implement the connection between the backboard 1 and the sub-board 2. The first connector 4 and the second connector 3 may be male and female ends of each other. It should be understood that the backboard and the sub-board may be connected in other manners, that is, a plurality of connection manners that the backboard 1 and the sub-board 2 are connected in parallel as shown in FIG. 2, that the backboard 1 and the sub-board 2 are horizontally inserted into each other as shown in FIG. 3, or the like.

The connector provided in this embodiment of this disclosure may be used as a female connector. A first end of the connector may be configured to be connected to a peer connector, that is, connected to a male connector. A second end may be configured to be connected to a circuit board.

Figure 4:
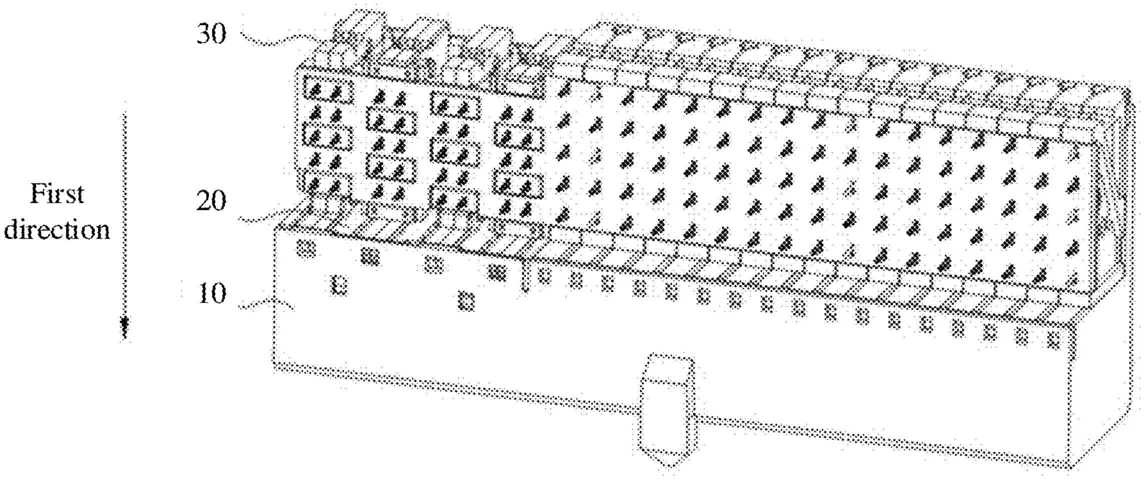
FIG. 4 is a schematic diagram of a structure of a connector according to an embodiment of this disclosure.
Figure 5:
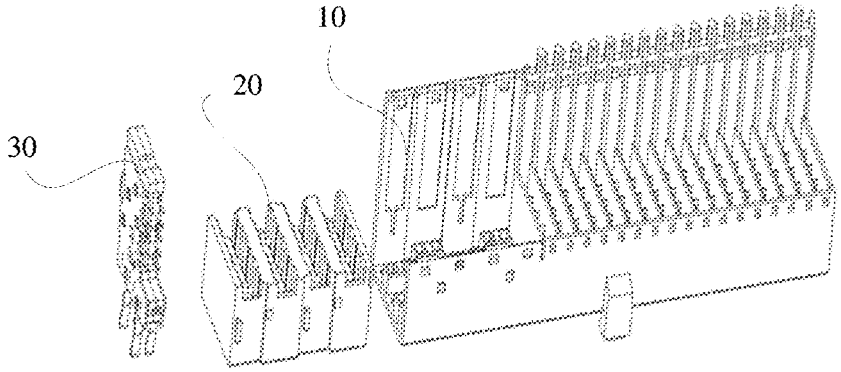
FIG. 5 is a schematic exploded diagram of modules in a connector according to an embodiment of this disclosure.

As shown in FIG. 4 and FIG. 5, FIG. 4 is a schematic diagram of a structure of a connector according to an embodiment of this disclosure, and FIG. 5 is a schematic exploded diagram of modules in a connector according to an embodiment of this disclosure. The connector mainly includes three modules, which are respectively a lead frame 30, an insulation housing 10, and a ground conductive assembly 20. For ease of describing a relative position relationship between the lead frame 30, the insulation housing 10, and the ground conductive assembly 20, a reference direction is established. A first direction shown in FIG. 4 is a direction of insertion/removal fitting of the connector and the peer connector. During assembly, the lead frame 30, the ground conductive assembly 20, and the insulation housing 10 are sequentially connected in a nested manner in the first direction. For example, the lead frame 30 is nested in the ground conductive assembly 20, and the ground conductive assembly 20 is nested in the insulation housing 10, to form a complete connector structure. There are a plurality of lead frames 30. The plurality of lead frames 30 may be arranged in a stacked manner in a direction vertical to the first direction.

Figure 6:
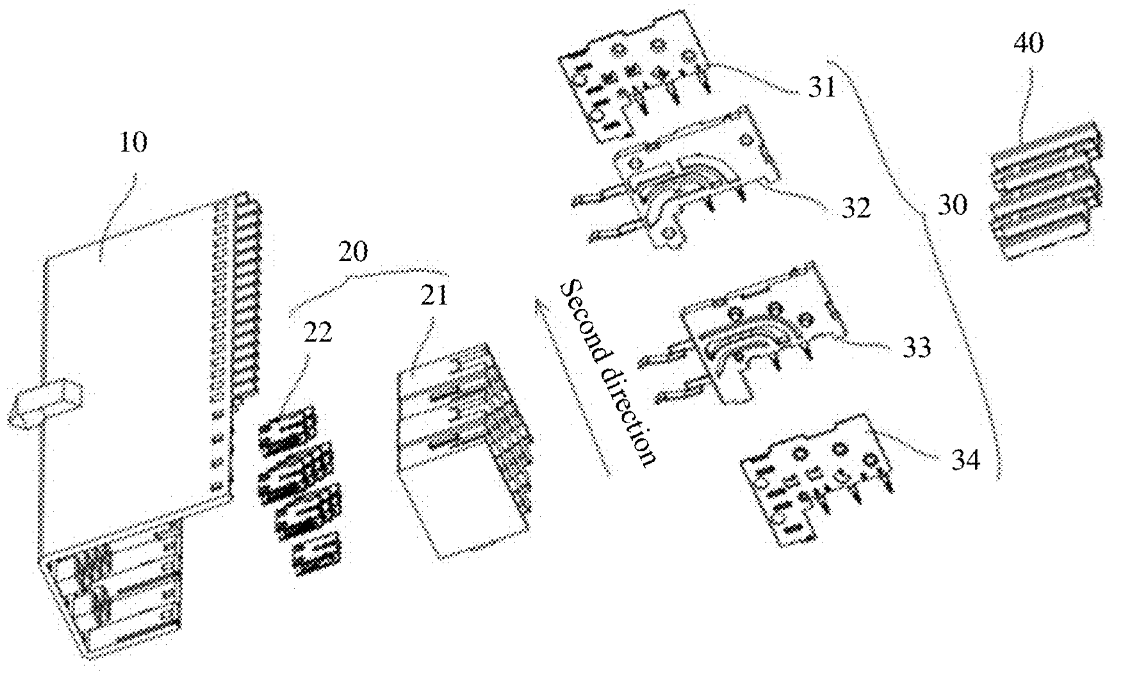
FIG. 6 is an exploded diagram of a structure of modules in a connector according to an embodiment of this disclosure.

FIG. 6 is an exploded diagram of a structure of modules in a connector according to an embodiment of this disclosure. A lead frame 30 is a main structure of the connector. The lead frame 30 in this embodiment of this disclosure may include a signal terminal group and a shield layer. There may be a plurality of signal terminal groups that may be used to transfer differential signals. The plurality of signal terminal groups may be arranged in a second direction in FIG. 6. The second direction may be vertical to the first direction in FIG. 4. FIG. 6 shows two signal terminal groups (32 and 33 in the figure) as an example. However, a quantity of signal terminal groups included in the lead frame 30 provided in this embodiment of this disclosure is not limited to two, and may alternatively be another quantity. There may be two shield layers included in the lead frame 30. The two shield layers (31 and 34 in FIG. 6) are arranged on two sides of the plurality of signal terminal groups. The shield layer may be a sheet-like structure made of a metal material. The shield layer is provided with a ground pin, namely, a ground terminal, and is configured to be electrically connected to a ground layer of a circuit board.

Figure 7:
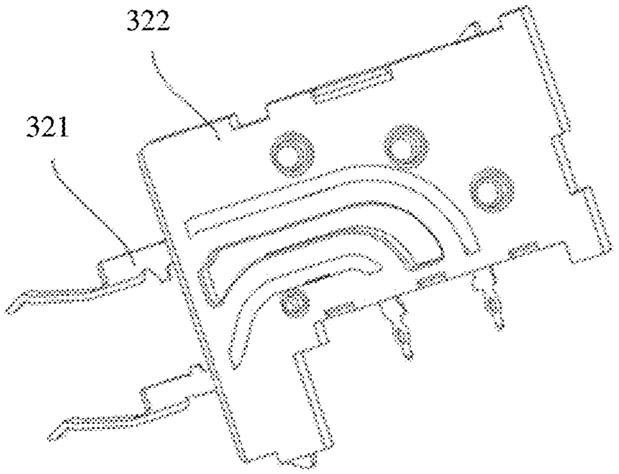
FIG. 7 is a schematic diagram of a structure of a signal terminal group of a connector according to an embodiment of this disclosure.

Refer to both FIG. 6 and FIG. 7. FIG. 7 is a schematic diagram of a structure of a signal terminal group according to an embodiment of this disclosure. The signal terminal group includes at least one signal terminal 321 and an insulation layer 322 wrapping the at least one signal terminal 321. For example, there may be two or more than two signal terminals 321. A quantity of signal terminals 321 may be determined according to a requirement for a quantity of data channels in an actual application. An isolator may be fastened in a snap-fit manner on the insulation layer 322. The isolator is located between adjacent signal terminals 321 on the insulation layer 322, and the isolator is made of a conductive material, to implement electrical isolation between adjacent signal terminals 321 in a same signal terminal group. Each signal terminal 321 is provided with a first connection end and a second connection end that are opposite to each other. The first connection end is configured to be in insertion/removal connection to a circuit board, to implement an electrical connection between the connector and a wiring layer of the circuit board. The second connection end is configured to be fitted with a signal terminal of a peer connector, to implement an electrical connection between the two connectors.

Figure 8:
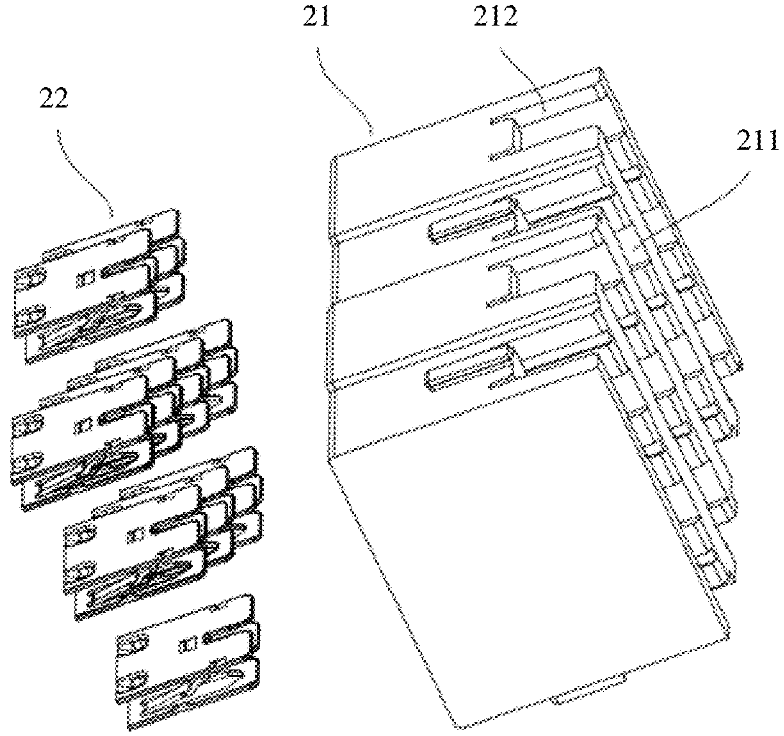
FIG. 8 is a schematic diagram of a structure of a ground conductive assembly of a connector according to an embodiment of this disclosure.

Refer to both FIG. 6 and FIG. 8. FIG. 8 is a schematic diagram of a structure of a ground conductive assembly according to an embodiment of this disclosure. The ground conductive assembly 20 includes a conductive housing 21 and a first ground terminal 22. The first ground terminal 22 may be assembled in the conductive housing 21 and electrically connected to the conductive housing 21. The conductive housing 21 may be a metal housing. For example, the metal housing may be prepared by using a conductive material such as copper, aluminum, or iron. Alternatively, the conductive housing 21 may also be made of a non-conductive material such as plastic, a rubber, or a resin, and a metal coating is applied on a surface, to form the conductive housing.

For ease of description, definitions are as follows: Two end portions of the conductive housing 21 that are opposite to each other in the first direction are respectively a first end and a second end. The first end is one end that is of the conductive housing 21 and that faces the peer connector, namely, one end used to be connected to the peer connector. The second end is one end that is of the conductive housing 21 and that is away from the peer connector, namely, one end used to mount the lead frame 30. The conductive housing 21 may be approximately a cuboid structure. A first cavity 211 that penetrates through the conductive housing 21 in the first direction is disposed in the conductive housing 21, that is, the first cavity 211 is provided with openings at both the first end and the second end of the conductive housing 21. The first cavity 211 is configured to accommodate a signal terminal. When there are a plurality of lead frames 30, a plurality of rows of first cavities 211 may be correspondingly disposed in the second direction, and each lead frame 30 corresponds to one row of first cavities 211. When the signal terminal group of the lead frame 30 includes a plurality of signal terminals, one row of first cavities 211 corresponding to the lead frame 30 includes a plurality of first cavities 211. It may be understood that the signal terminals may correspond to the first cavities 211 in different manners. For example, when the lead frame 30 includes one signal terminal group, signal terminals may be in a one-to-one correspondence with first cavities 211, that is, each first cavity 211 correspondingly accommodates one signal terminal; or when the lead frame 30 includes a plurality of signal terminal groups, signal terminals are not in a one-to-one correspondence with first cavities 211, that is, each first cavity 211 accommodates a plurality of signal terminals.

A plurality of notches 212 may be disposed at the second end of the conductive housing 21, and correspond to a plurality of rows of first cavities 211. During assembly, the lead frame 30 is snap-fitted in the notches 212. A second connection end of the signal terminal extends into the first cavity 211 and is electrically isolated from the conductive housing 21, that is, the second connection end of the signal terminal is not in contact with any side wall of the first cavity 211.

When the lead frame 30 is snap-fitted at the second end of the conductive housing 21, the shield layers 31 and 34 are in contact with and are electrically connected to the conductive housing 21. For example, when the lead frame 30 is snap-fitted in the notches 212, the shield layers located on two sides of the signal terminal group are snap-fitted in the notches 212 and abut against inner walls of the notches 212, to implement an electrical connection between the shield layer and the conductive housing 21. Therefore, the conductive housing 21 may be used as an extension of the shield layer, and the conductive housing 21 and the shield layer have a same electric potential. When the connector is assembled with a circuit board, the shield layer may be electrically connected to a ground layer of the circuit board, so that the shield layer may be used as a reference ground of the connector. In addition, the shield layer is electrically connected to the conductive housing 21, and the conductive housing 21 has a specific volume. Therefore, the conductive housing 21 may also be used as a reference ground of the connector.

When the connector in this embodiment of this disclosure is in insertion fitting with the peer connector, the signal terminal of the peer connector may be inserted into the first cavity 211 through the first end of the conductive housing 21, and may be in contact with the signal terminal in this embodiment of this disclosure, to implement an electrical connection between the signal terminals of the two connectors.

FIG. 6 further shows that an end protection sheet 40 is disposed at a position that is of the lead frame 30 and that corresponds to the first connection end of the signal terminal, and the end protection sheet 40 is made of a conductive material. The end protection sheet 40 may be snap-fitted to the shield layers 31 and 34, to implement an electrical connection to the shield layers. Specifically, the end protection sheet 40 is electrically connected to ground pins of the shield layers. The end protection sheet 40 may work with the notches 212 in FIG. 8, so that the position of the lead frame 30 is stable. The end protection sheet 40 is provided with a through slot. The first connection end of the signal terminal extends into the through slot and is exposed, and is not in contact with any side wall of the through slot, to be electrically isolated from the end protection sheet 40. When the connector in this embodiment of this disclosure is in insertion fitting with the circuit board, the end protection sheet 40 is electrically connected to the ground layer of the circuit board, so that the shield layers are grounded. The first connection end of the signal terminal may be inserted into a via hole of the circuit board, to be electrically connected to the wiring layer of the circuit board.

It can be learned from the foregoing descriptions that the second connection end of the signal terminal is electrically isolated because the second connection end is located in the first cavity 211 and is not in contact with any side wall of the first cavity 211. A main body part (a part between the first connection end and the second connection end of the signal terminal) of the signal terminal may be isolated by the shield layer, and the first connection end of the signal terminal may be isolated by the end protection sheet. That is, the signal terminal may be entirely isolated from the second connection end to the first connection end. This ensures a shielding effect between signal terminals of different lead frames 30, and implements full-link ground isolation of a signal differential pair in the connector, so that an inter-board data transmission rate can be improved, and crosstalk between signals is improved.

Figure 9:
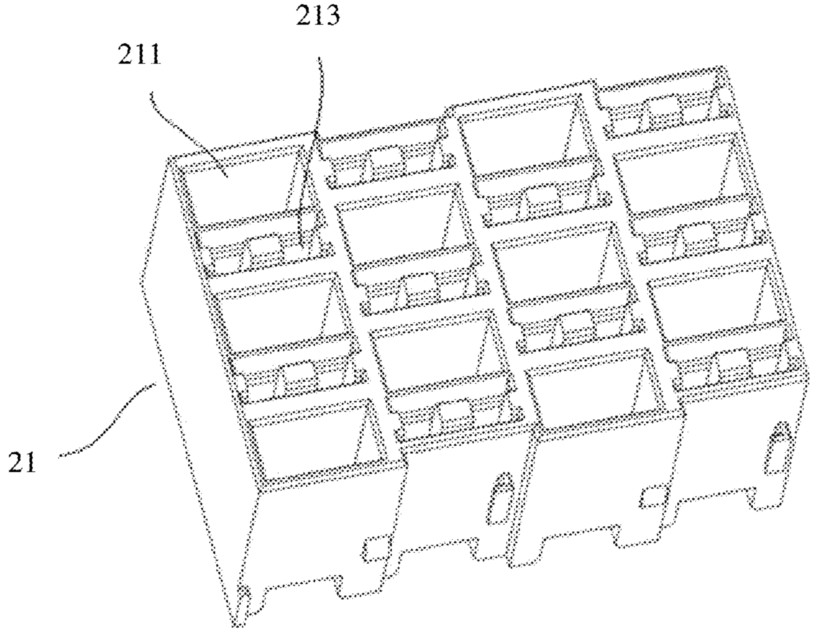
FIG. 9 is a schematic diagram of a structure of a conductive housing of a connector according to an embodiment of this disclosure.
Figure 10:
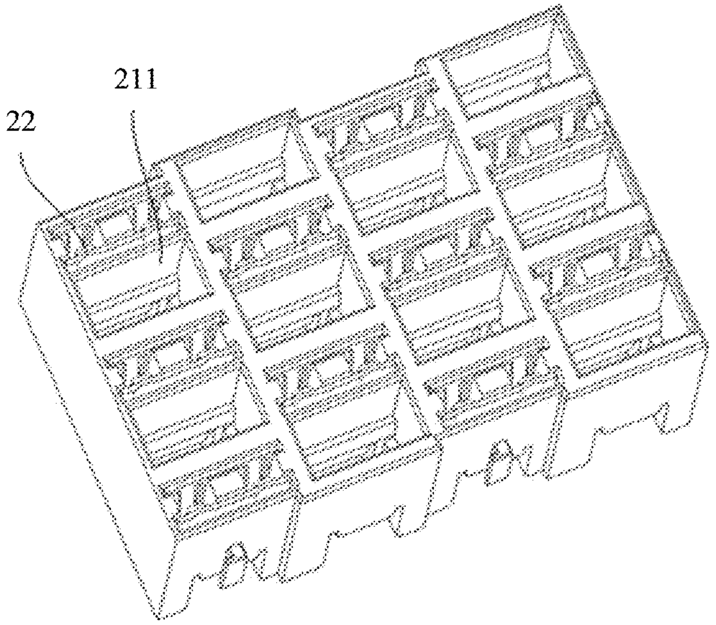
FIG. 10 is a schematic diagram of assembly of a conductive housing and a first ground terminal of a connector according to an embodiment of this disclosure.

Refer to FIG. 9 and FIG. 10. FIG. 9 is a schematic diagram of a structure of a conductive housing according to an embodiment of this disclosure, and FIG. 10 is a schematic diagram of assembly of a conductive housing and a first ground terminal according to an embodiment of this disclosure. A second cavity 213 configured to accommodate the first ground terminal 22 is further disposed in the conductive housing 21. The second cavity 213 may be a cavity provided with an opening at one end. The opening of the second cavity 213 corresponds to a first end of the conductive housing 21, so that a second ground terminal of a peer connector may be inserted into the second cavity 213 through the opening, and may be in contact with the first ground terminal 22 in this embodiment of this disclosure, to implement an electrical connection between the ground terminals of the two connectors. Alternatively, the second cavity 213 may be a cavity provided with openings at both ends. That is, the second cavity 213 is provided with openings at both a first end and a second end of the conductive housing 21, that is, the second cavity 213 penetrates through the conductive housing 21 in a first direction. In FIG. 9 and FIG. 10, an example in which the second cavity 213 penetrates through the conductive housing 21 is used. Similarly, a plurality of rows of second cavities 213 may be disposed in a second direction. One row of second cavities 213 may include a plurality of second cavities 213, and may be disposed in a matched manner based on a quantity of second ground terminals of the peer connector. During implementation, second cavities 213 and first cavities 211 may be alternately disposed. For example, in one row of first cavities 211, a second cavity 213 is disposed between adjacent first cavities 211. That is, the second cavities 213 and the first cavities 211 are alternately disposed and arranged in a row. In addition, different rows of second cavities 213 and first cavities 211 may also be alternately disposed in the second direction. An arrangement manner of the second cavities 213 and the first cavities 211 may be set based on actual positions of a signal terminal and a ground terminal of the peer connector. This is not limited in this embodiment of this disclosure.

Refer to the foregoing descriptions. Signal connection and grounding statuses after the peer connector and the connector in this embodiment of this disclosure are assembled with a circuit board are described. The second ground terminal of the peer connector is electrically connected to the first ground terminal 22 in this embodiment of this disclosure, the first ground terminal 22 is electrically connected to the conductive housing 21, the shield layers (31 and 34 in FIG. 6) are also electrically connected to the conductive housing 21, and the shield layers are electrically connected to a ground layer of the circuit board through an end protection sheet, to form a complete ground path. In addition, the signal terminal of the peer connector is electrically connected to the signal terminal in this embodiment of this disclosure, and the signal terminal in this embodiment of this disclosure is also electrically connected to a wiring layer of the circuit board, to form a complete signal transmission path.

Figure 11:
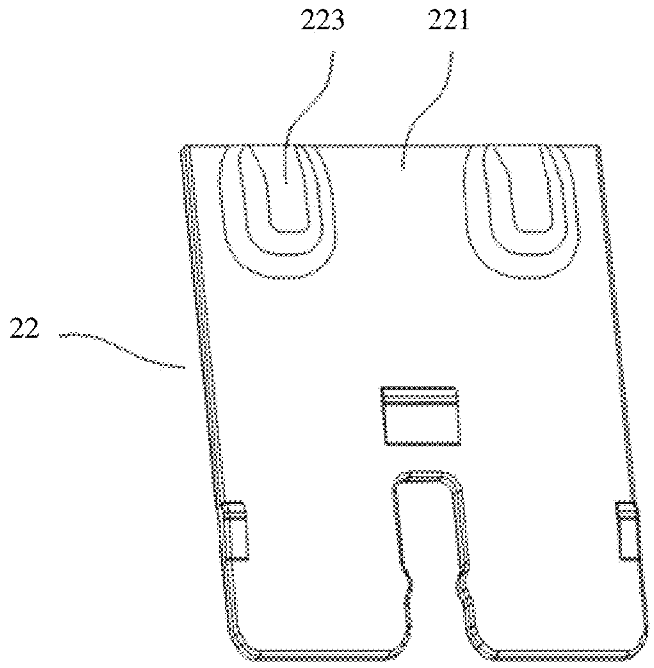
FIG. 11 is a schematic diagram of a structure of a first ground terminal of a connector according to an embodiment of this disclosure.

FIG. 11 is a schematic diagram of a structure of a first ground terminal according to an embodiment of this disclosure. The first ground terminal 22 includes a support plate 221. A protrusion 223 is provided on one side of the support plate 221. The protrusion 223 and the support plate 221 may be integrally formed. For example, the protrusion 223 may be formed through stamping on the support plate 221.

During assembly, the support plate 221 may be inserted into a second cavity and fastened in a snap-fit manner, and is close to a first end of a conductive housing. The support plate 221 abuts against a side wall of the second cavity to implement an electrical connection to the side wall of the second cavity, that is, to implement an electrical connection to the conductive housing. For example, a side opposite to one side that is of the support plate 221 and that is provided with the protrusion 223 is fastened on an inner wall of the second cavity. The protrusion 223 is used as a part that is in contact with a second ground terminal of a peer connector. During disposition, the protrusion 223 may be close to one end that is of the conductive housing and that is fitted with the peer connector, that is, close to the first end of the conductive housing, that is, close to an opening of the second cavity.

During actual application, first ground terminals 22 may be used in pairs, that is, two first ground terminals 22 are fastened in one second cavity in pairs. For the two first ground terminals 22, side that is of support plates 221 and that are provided with protrusions 223 may be disposed opposite to each other. The other side of the support plates 221 is electrically connected to two opposite side walls of the second cavity respectively. The protrusions 223 of the two first ground terminals 22 correspond to each other, may be in contact with each other, or may have a gap. When the second ground terminal is inserted into the second cavity, the second ground terminal may be inserted between a pair of protrusions 223 of the two first ground terminals 22. The protrusions 223 of the two first ground terminals 22 may clamp the second ground terminal, to implement an electrical connection between the second ground terminal and elastic arms 222. In this case, a clamping force of the two first ground terminals 22 on the second ground terminal is large, and an electrical connection to the second ground terminal is stable.

Figure 12:
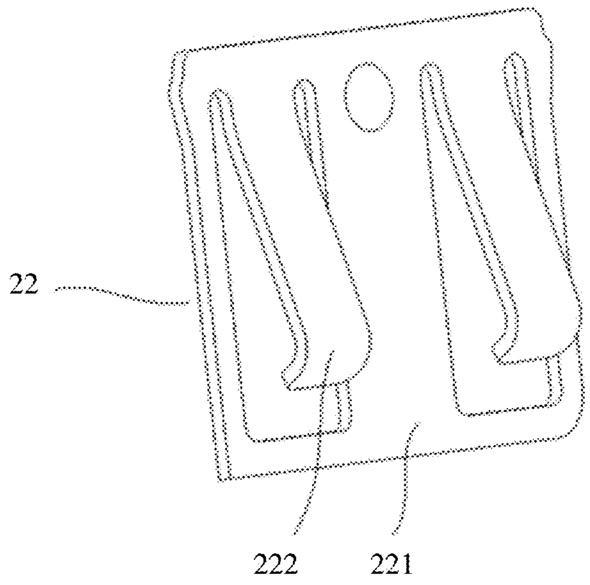
FIG. 12 is another schematic diagram of a structure of a first ground terminal of a connector according to an embodiment of this disclosure.

FIG. 12 is another schematic diagram of a structure of a first ground terminal according to an embodiment of this disclosure. The first ground terminal 22 includes a support plate 221 and an elastic arm 222 that are connected to each other. One end of the elastic arm 222 is fixedly connected to one side of the support plate 221, and the other end is a free end. The free end of the elastic arm 222 protrudes from a plane on which the support plate 221 is located. Hollowing processing may be performed on an orthographic projection region of the elastic arm 222 on the support plate 221. In addition, the free end of the elastic arm 222 may be in a bent shape. When a peer connector is inserted, scratches on a second ground terminal can be reduced.

During assembly, the support plate 221 may be inserted into a second cavity and fastened in a snap-fit manner, and is close to a first end of a conductive housing. The support plate 221 abuts against a side wall of the second cavity to implement an electrical connection to the side wall of the second cavity, that is, to implement an electrical connection to the conductive housing. For example, a side opposite to one side that is of the support plate 221 and that is provided with the elastic arm 222 is fastened on an inner wall of the second cavity. The free end of the elastic arm 222 is used as a connection end that is in contact with the second ground terminal of the peer connector.

During disposition, the free end of the elastic arm 222 may be close to one end that is of the conductive housing and that is fitted with the peer connector, that is, close to the first end of the conductive housing, that is, close to an opening of the second cavity.

During actual application, first ground terminals 22 may be used in pairs, that is, two first ground terminals 22 are fastened in one second cavity in pairs. For the two first ground terminals 22, side that is of support plates 221 and that are connected to elastic arms 222 may be disposed opposite to each other. The other side of the support plates 221 is electrically connected to two opposite side walls of the second cavity respectively. The elastic arms 222 of the two first ground terminals 22 correspond to each other, may be in contact with each other, or may have a gap. When the second ground terminal is inserted into the second cavity, the second ground terminal may be inserted between a pair of elastic arms 222 of the two first ground terminals 22. The elastic arms 222 of the two first ground terminals 22 may clamp the second ground terminal, to implement an electrical connection between the second ground terminal and the elastic arms 222.

Figure 13:
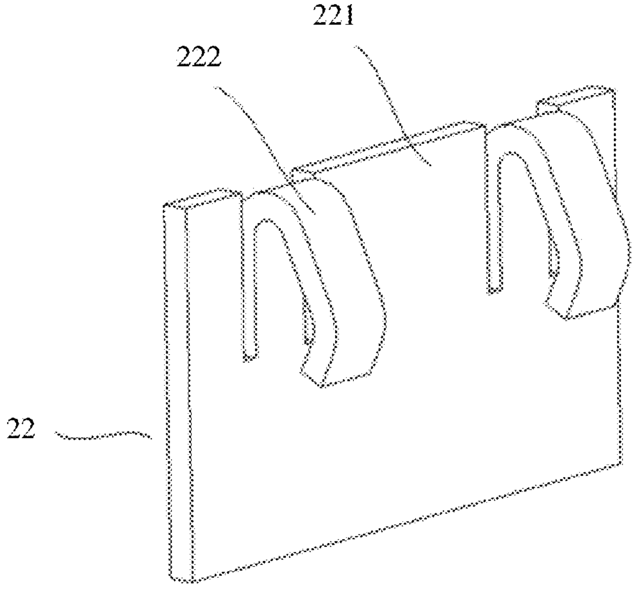
FIG. 13 is still another schematic diagram of a structure of a first ground terminal of a connector according to an embodiment of this disclosure.

FIG. 13 is still another schematic diagram of a structure of a first ground terminal according to an embodiment of this disclosure. The first ground terminal 22 includes a support plate 221 and an elastic arm 222 that are connected to each other. There may be two elastic arms 222, and the two elastic arms 222 are disposed in parallel. One end of the elastic arm 222 is fixedly connected to one side of the support plate 221, and the other end is a free end. The free end of the elastic arm 222 protrudes from a plane on which the support plate 221 is located. The free end of the elastic arm 222 may be in a bent shape. A difference from the first ground terminal 22 shown in FIG. 12 is that an end portion of the support plate 221 of the first ground terminal 22 shown in FIG. 13 is provided with an opening. The elastic arm 222 is located in the opening, and one end that is of the elastic arm 222 and that is connected to the support plate 221 is flush with the plane on which the support plate 221 is located.

During actual application, similarly, first ground terminals 22 may be used in pairs, that is, two first ground terminals 22 are fastened in one second cavity in pairs. Support plates 221 of the two first ground terminals 22 are electrically connected to two opposite side walls of the second cavity respectively. The elastic arms 222 of the two first ground terminals 22 are disposed opposite to each other and are in a one-to-one correspondence. A total of two pairs of elastic arms 222 of the two first ground terminals 22 may abut against each other, or may have a gap. When a second ground terminal is inserted into the second cavity, the two pairs of elastic arms 222 are both connected to the second ground terminal, and together clamp the second ground terminal, to improve contact pressure between the elastic arms 222 and the second ground terminal, to improve a grounding effect.

It should be understood that, when there are a plurality of first ground terminals 22, the plurality of first ground terminals 22 may all use a structure shown in FIG. 11, FIG. 12, or FIG. 13, or may use a combination of the structures in the foregoing examples.

Figure 14:
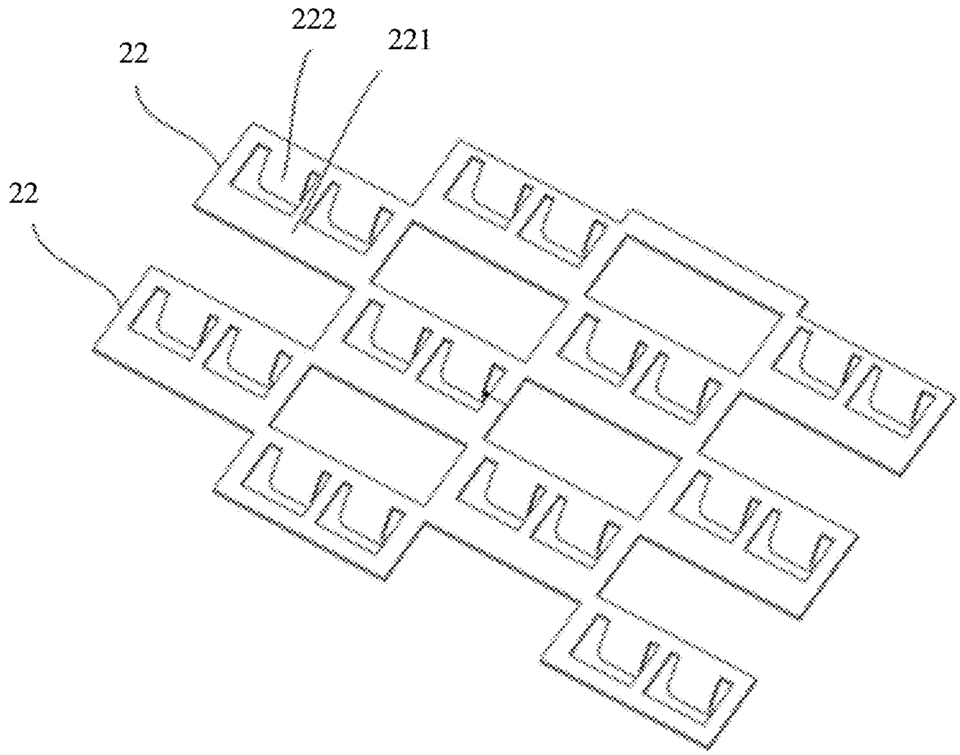
FIG. 14 is still another schematic diagram of a structure of a first ground terminal of a connector according to an embodiment of this disclosure.

FIG. 14 is still another schematic diagram of a structure of a first ground terminal according to an embodiment of this disclosure. The first ground terminal 22 includes a support plate 221 and an elastic arm 222 that are connected to each other. There are a plurality of first ground terminals 22, and support plates 221 of the plurality of first ground terminals 22 are connected to form an integrated plate-shaped structure. Each first ground terminal 22 includes two elastic arms 222 that are disposed in parallel. One end of each elastic arm 222 is fixedly connected to the support plate 221, and the other end is a free end. The free end of the elastic arm 222 may be in a bent shape. Hollowing processing may be performed on an orthographic projection region of the elastic arm 222 on the support plate 221. It may also be understood as that hollowing processing is performed on a position that is of the support plate 221 and that corresponds to a second cavity in a first direction, to avoid the disposed support plate 221 affecting a connection to the peer connector, that is, a hollowing structure on the support plate 221 is used as a window for avoiding insertion of a second ground terminal of the peer connector into the second cavity. The elastic arm 222 protrudes from a plane on which the support plate 221 is located. Two elastic arms 222 of each first ground terminal 22 may protrude toward a same side of the support plate 221, and elastic arms 222 of all first ground terminals 22 may protrude in a same direction.

Figure 15:
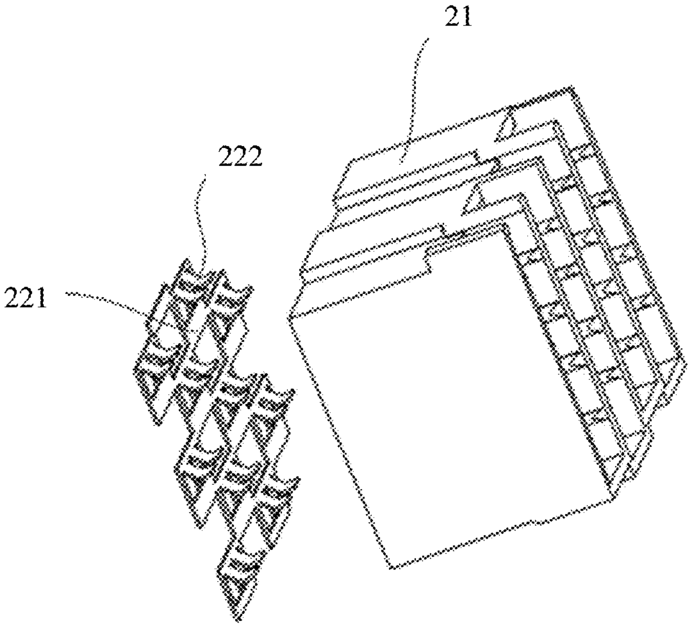
FIG. 15 is a schematic diagram of a relative position at which a first ground terminal and a conductive housing of a connector are fitted according to an embodiment of this disclosure.

FIG. 15 is a schematic diagram of a relative position at which a first ground terminal and a conductive housing are fitted according to an embodiment of this disclosure. The first ground terminal in the figure is in a structure form shown in FIG. 14. During actual application, a support plate 221 may be fastened on one end that is of the conductive housing 21 and that faces a peer connector, that is, fastened on a first end of the conductive housing 21, and the support plate 221 is electrically connected to the conductive housing 21. The support plate 221 and the conductive housing 21 may be fastened in a snap-fit manner, and the support plate 221 may be tightly pressed on the conductive housing 21 through fitting between the conductive housing 21 and an insulation housing, to improve stability of an electrical connection between the support plate 221 and the conductive housing 21. One side that is of the support plate 221 and that is connected to elastic arms 222 faces the conductive housing 21, and the elastic arms 222 extend into a second cavity. When a second ground terminal is inserted into the second cavity, two elastic arms 222 that are of each first ground terminal and that are disposed in parallel both abut against the second ground terminal.

Figure 16:
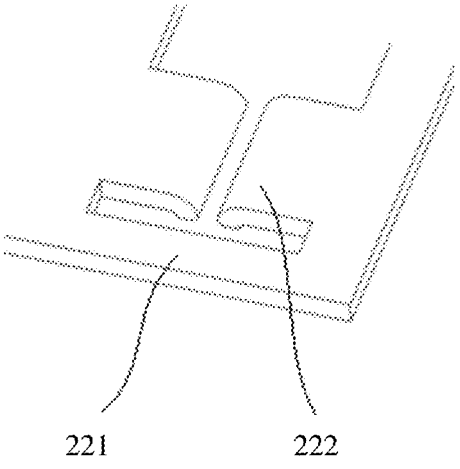
FIG. 16 is still another schematic diagram of a structure of a first ground terminal of a connector according to an embodiment of this disclosure.

FIG. 16 is still another schematic diagram of a structure of a first ground terminal according to an embodiment of this disclosure. The first ground terminal includes a support plate 221 and an elastic arm 222 that are connected to each other. There are a plurality of first ground terminals, and support plates 221 of the plurality of first ground terminals may be connected to form an integrated plate-shaped structure. The first ground terminal includes two elastic arms 222. One end of each elastic arm 222 is fixedly connected to the support plate 221, and the other end is a free end. In each first ground terminal, free ends of two elastic arms 222 may be disposed opposite to each other. For example, the free ends of the two elastic arms 222 may abut against each other, or may have a gap. The free end of the elastic arm 222 may be in a bent shape. Hollowing processing is performed on an orthographic projection region of the elastic arm 222 on the support plate 221. The elastic arm 222 protrudes from a plane on which the support plate 221 is located. The two elastic arms 222 of each first ground terminal may protrude toward a same side of the support plate 221, and elastic arms 222 of all first ground terminals may protrude in a same direction. During actual application, the support plate 221 may be fastened on one end that is of a conductive housing and that is used to face a peer connector, that is, fastened on a first end of the conductive housing, and is electrically connected to the conductive housing. One side that is of the support plate 221 and that is connected to the elastic arms 222 faces the conductive housing, and the elastic arms 222 extend into a second cavity. When a second ground terminal is inserted into the second cavity, the two elastic arms 222 that are of each first ground terminal and that are disposed opposite to each other both abut against the second ground terminal, and together clamp the second ground terminal, to improve contact pressure between the elastic arms and the second ground terminal, to improve a grounding effect.

It should be understood that, when there are a plurality of first ground terminals 22, the plurality of first ground terminals 22 may all use a structure shown in FIG. 14 or FIG. 16, or may use a combination of the structures in the foregoing examples.

The support plate 221 and the elastic arm 222 in the foregoing examples are in an integrated structure, and may be entirely formed through stamping by using a conductive metal plate. For example, forming through stamping may be performed by using a copper plate, an aluminum plate, an iron plate, or the like.

Figure 17:
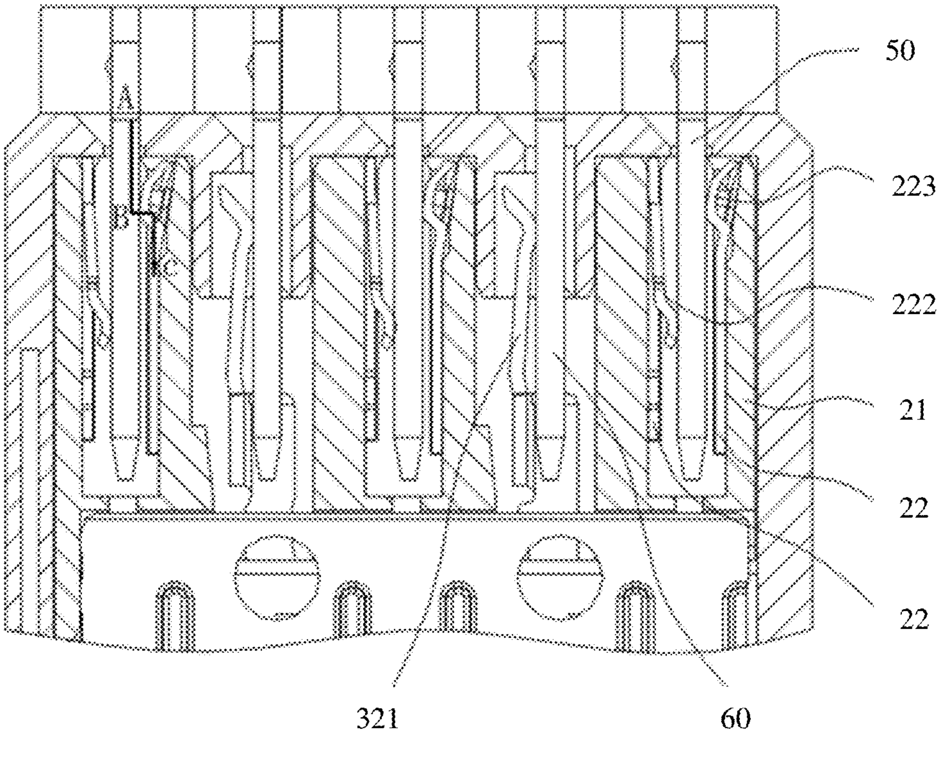
FIG. 17 is a schematic diagram of fitting between a connector and a peer connector according to an embodiment of this disclosure.

FIG. 17 is a schematic diagram of fitting between a connector and a peer connector according to an embodiment of this disclosure. In the figure, first ground terminals 22 are used in pairs. One of the first ground terminals 22 is the first ground terminal 22 shown in FIG. 11, and the other is the first ground terminal 22 shown in FIG. 12. In addition, for the first ground terminal 22 that is provided with a protrusion 223, the protrusion 223 of the first ground terminal 22 is disposed close to a first end of a conductive housing 21. For the first ground terminal 22 that is provided with an elastic arm 222, one end that is of the elastic arm 222 of the first ground terminal 22 and that is connected to a support plate may be disposed close to the first end of the conductive housing 21. When the peer connector is inserted into the conductive housing 21, a signal terminal 60 of the peer connector is electrically connected to a signal terminal 321 of the connector in this embodiment of this disclosure in a one-to-one correspondence. A second ground terminal 50 of the peer connector is electrically connected to the first ground terminal 22 of the connector in this embodiment of this disclosure.

For ease of description, the following reference points are defined: a root A of the second ground terminal 50, a contact point B between the second ground terminal 50 and the first ground terminal 22, and a bit end C of the first ground terminal 22 (namely, a connection point between the first ground terminal 22 and the conductive housing 21). Refer to a bold line shown in FIG. 17. The bold line refers to a current path of a ground return. When the ground return flows into the first ground terminal 22 from the second ground terminal 50, because the conductive housing 21 is used as a reference ground of the connector, a ground return path is: A-B-C when the peer connector is fitted with the connector in this embodiment of this disclosure. When the ground return is transmitted between the two connectors, a length of a current path is: a length of a current path from a point A to a point B on the second ground terminal 50+a length of a current path from a point B to a point C on the first ground terminal 22, that is, AB+BC. Because the protrusion 223 may be disposed close to the first end of the conductive housing 21, the contact point B between the protrusion 223 and the second ground terminal 50 may be closer to an opening of the second cavity. When the connector in this embodiment of this disclosure is fitted with the peer connector, the contact point B is close to the root A of the second ground terminal 50, so that AB described above is short, and then the ground return path is short.

Figure 18:
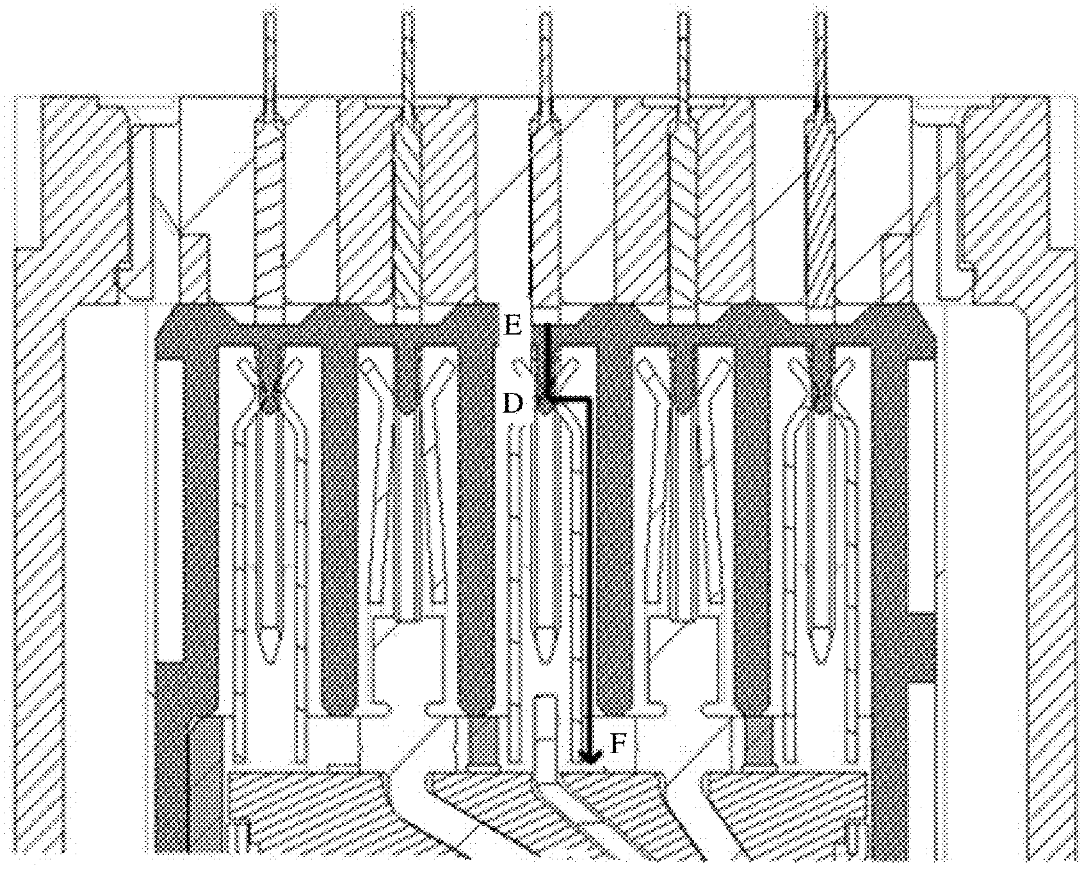
FIG. 18 is a schematic diagram of fitting between two connectors in the conventional technology.

Also refer to FIG. 18. FIG. 18 is a schematic diagram of fitting between two connectors in the conventional technology. A pin that is of a connector in the conventional technology and that is extended from a shield layer is used as a ground terminal. When two connectors are fitted, a contact point between ground terminals of the two connectors is D. Roots of the ground terminals are respectively E and F. A ground return path is: E-D-F. When a ground return is transmitted between the two connectors, a length of a current path is: a length of a current path from a point E to a point D on a ground terminal of one connector+a length of a current path from a point D to a point F on a ground terminal of the other connector, that is, ED+DF.

It can be learned by comparing FIG. 17 and FIG. 18 that, in the conventional technology, because the pin extended from the shield layer is used as a ground terminal that is in contact with a peer connector, when the two connectors are fitted, a distance between a reference ground (the shield layer) of the connector and a ground terminal of the peer connector is long, and a long current path is required for the ground return to be transmitted from one connector to the other connector. However, in the connector provided in this embodiment of this disclosure, a disposed conductive housing is used to be electrically connected to the shield layer, so that the conductive housing can be used as a reference ground of the connector. In addition, compared with the shield layer, the conductive housing shortens a distance to the ground terminal of the peer connector, so that a length of the current path of the ground return is shortened.

Figure 19:
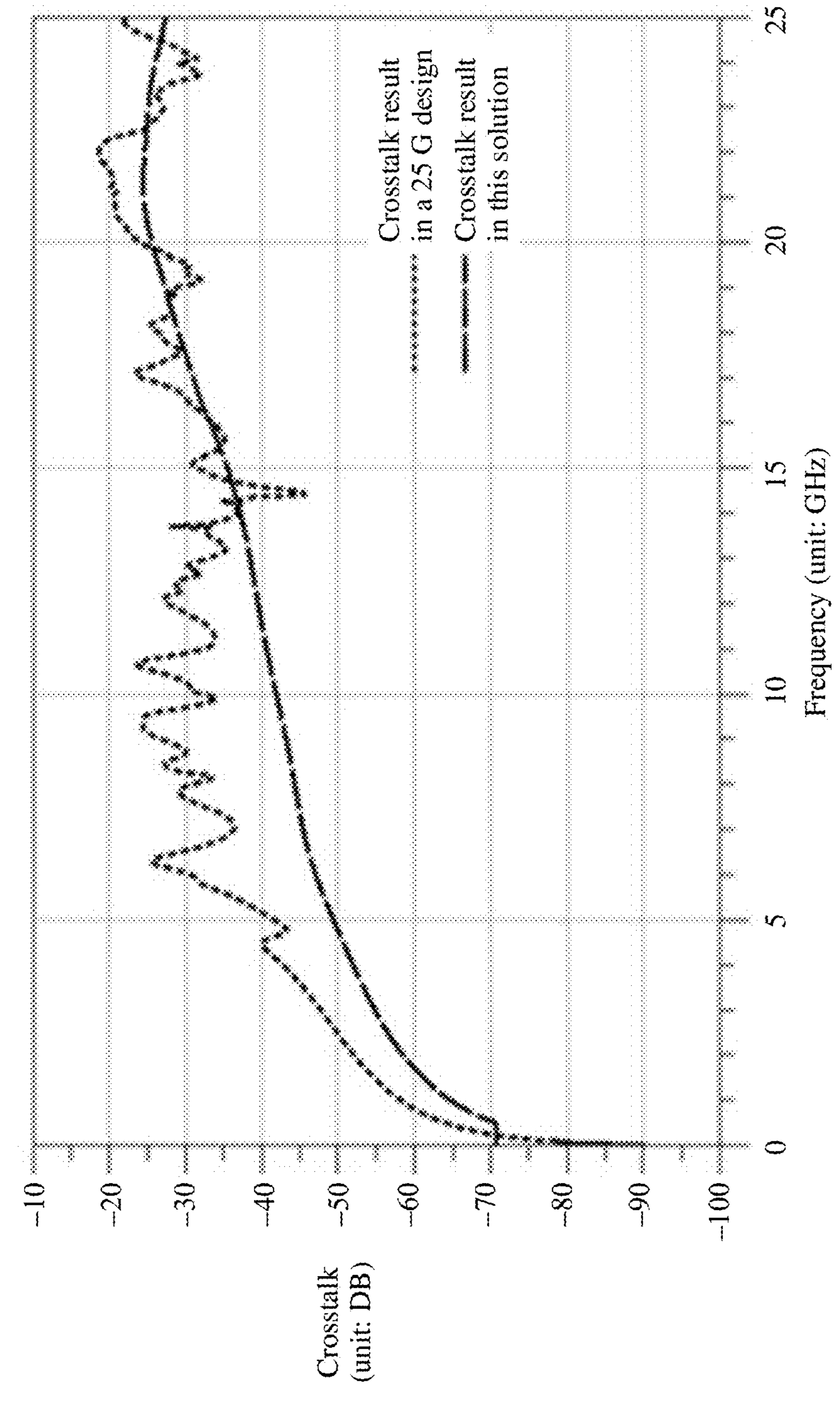
FIG. 19 is a simulation diagram of a crosstalk effect of a connector according to an embodiment of this disclosure.

For ease of understanding a crosstalk effect of the connector provided in this embodiment of this disclosure, simulation is performed on the connector provided in this embodiment of this disclosure shown in FIG. 17 and the connector in the conventional technology shown in FIG. 18 (selecting a connector that matches a 25 G design as an example). A simulation result is shown in FIG. 19. It can be learned from FIG. 19 that as a frequency increases, crosstalk of the connector provided in this embodiment of this disclosure is significantly improved.

It can be learned from the foregoing descriptions that, in the connector provided in this embodiment of this disclosure, a structure of a contact region is designed, so that the conductive housing is electrically connected to the shield layer, and then the conductive housing is used as the reference ground. A first ground terminal is disposed in the conductive housing and is electrically connected to the conductive housing. A direct return from the ground terminal of the peer connector to the reference ground during mutual fitting is implemented. A shorter return path is provided. A redundant return path, in a contact area of a conventional connector, in which a ground return first passes through a pin that is extended from the shield layer and then flows to a large reference ground is broken through. In this way, one of bottlenecks for improvement of a connector rate is resolved, and SI performance of crosstalk and the like between signals of the connector is significantly improved.

Figure 20:
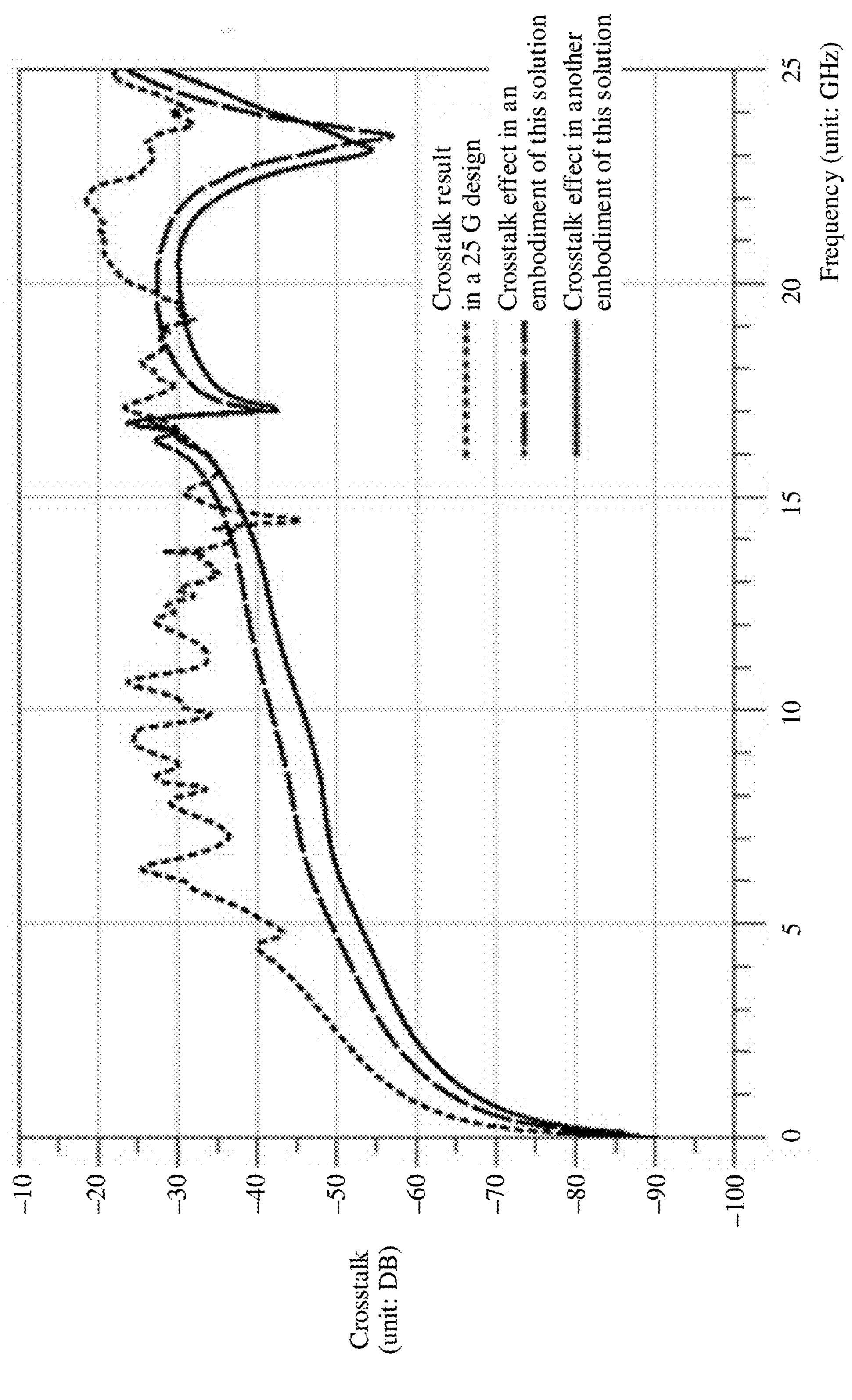
FIG. 20 is a simulation diagram of a crosstalk effect of a connector according to an embodiment of this disclosure.

To further understand the crosstalk effect of the connector provided in this embodiment of this disclosure, simulation is performed on the connector using the first ground terminal shown in FIG. 11, the connector using the first ground terminal shown in FIG. 14, and the connector in the conventional technology shown in FIG. 18. A simulation result is shown in FIG. 20. It can be learned from FIG. 20 that a crosstalk effect of the connector using the first ground terminal shown in FIG. 14 (which corresponds to a crosstalk effect in an embodiment of this solution in FIG. 20) and a crosstalk effect of the connector using the first ground terminal shown in FIG. 11 (which corresponds to a crosstalk effect in another embodiment of this solution in FIG. 20) are both better than a crosstalk effect in the foregoing technical solution in the conventional technology.

Figure 21:
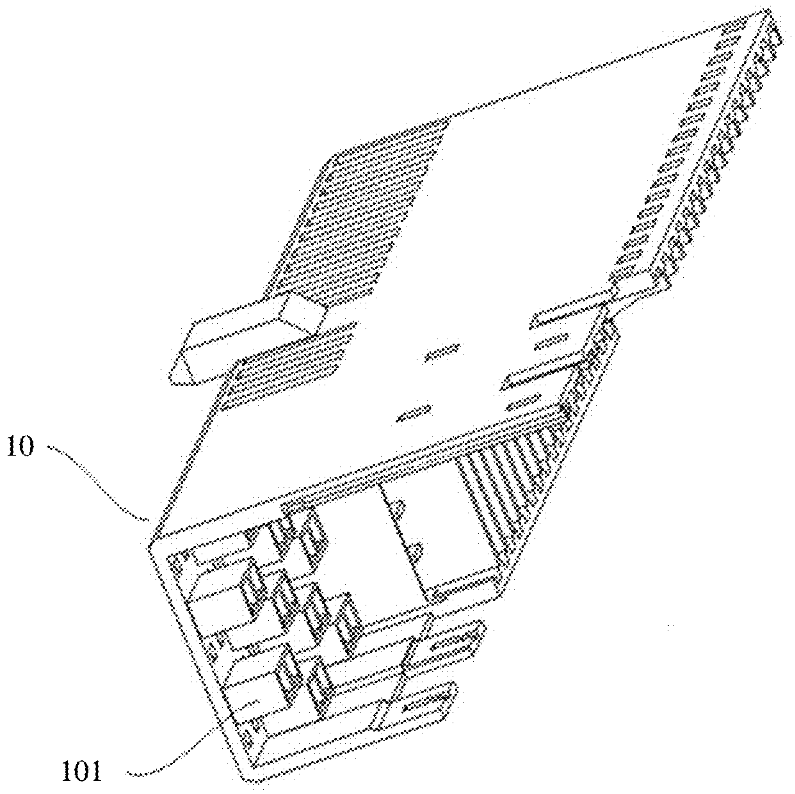
FIG. 21 is a schematic diagram of a structure of an insulation housing of a connector according to an embodiment of this disclosure.

FIG. 21 is a schematic diagram of a structure of an insulation housing according to an embodiment of this disclosure. The insulation housing 10 is used as a support structure of an entire connector. The insulation housing 10 wraps a ground conductive assembly and a lead frame, and the insulation housing 10 is used as a connection member to integrate the ground conductive assembly and the lead frame. During implementation, the insulation housing 10 may be provided with a mounting slot, and a first end of a conductive housing is inserted into the mounting slot. In addition, the mounting slot of the insulation housing 10 is provided with a through hole that is fitted with each signal terminal and a first ground terminal. During assembly with a peer connector, a signal terminal and a second ground terminal of the peer connector may pass through the through hole on the insulation housing 10 and then be fitted with the signal terminal and the first ground terminal in this embodiment of this disclosure.

As an optional solution, an insulation sleeve 101 configured to be inserted into a first cavity is disposed on a surface that is of the mounting slot of the insulation housing 10 and that faces the conductive housing, a length direction of the insulation sleeve 101 is a first direction, and the insulation sleeve 101 is separately provided with openings at two ends in the first direction. When the lead frame is assembled with the conductive housing, the insulation sleeve 101 is inserted into the first cavity, and a second connection end of each signal terminal is inserted into the insulation sleeve 101 in a one-to-one correspondence. The conductive housing is insulated from the second connection end of the signal terminal by using a wall of the insulation sleeve 101, to avoid contact between the second connection end of the signal terminal and the conductive housing, so that an electrical isolation effect of the conductive housing on the signal terminal is more stable. During assembly with the peer connector, the signal terminal of the peer connector is inserted into the insulation sleeve 101, and is electrically connected to the signal terminal in this embodiment of this disclosure in a one-to-one correspondence.

It should be understood that, as an optional structure, whether the insulation housing 10 is disposed may be determined according to actual requirements for the structure and assembly when the connector is disposed.

It is clear that a person skilled in the art can make various modifications and variations to this disclosure without departing from the spirit and scope of this disclosure. In this way, this disclosure is intended to cover these modifications and variations of this disclosure provided that they fall within the scope of protection defined by the claims of this disclosure and their equivalent technologies.

What is claimed is:

1. A connector, comprising a ground conductive assembly and a lead frame, wherein the ground conductive assembly comprises a conductive housing and a first ground terminal, the conductive housing comprises a first cavity and a second cavity, the conductive housing further comprises a first end and a second end that are opposite to each other in a first direction, the first end of the conductive housing is configured to be connected to a peer connector, and the first ground terminal is disposed at the first end of the conductive housing, extends into the second cavity, is electrically connected to an inner wall of the second cavity, and comprises a support plate and an elastic arm;

the support plate is located in the second cavity and is disposed closer to the first end of the conductive housing than to the second end of the conductive housing;

the elastic arm is disposed on one side of the support plate, and the elastic arm is configured to abut against a second ground terminal, wherein the second ground terminal is of the peer connector;

the lead frame is disposed at the second end of the conductive housing, the lead frame comprises a plurality of signal terminal groups and shield layers arranged on two sides of the plurality of signal terminal groups, each signal terminal group of the plurality of signal terminal groups comprises at least one signal terminal, each shield layer of the shield layers is electrically connected to the conductive housing, and the at least one signal terminal extends into the first cavity and is isolated from an inner wall of the first cavity;

the first direction is an insertion direction of the connector and the peer connector; and the second cavity accommodates two first ground terminals, elastic arms of the two first ground terminals are disposed opposite to each other, and the elastic arms of the two first ground terminals are configured to clamp the second ground terminal of the peer connector.

2. The connector according to claim 1, wherein the first ground terminal comprises a support plate, and the support plate is located in the second cavity and is disposed closer to the first end of the conductive housing than to the second end of the conductive housing; and a protrusion is provided on one side of the support plate, and the protrusion is configured to abut against a second ground terminal, wherein the second ground terminal is of the peer connector.

3. The connector according to claim 2, wherein one side that is of the support plate and that is away from the protrusion is connected to the inner wall of the second cavity.

4. The connector according to claim 1, wherein one side that is of the support plate and that is away from the elastic arm is connected to the inner wall of the second cavity.

5. The connector according to claim 1, wherein the first ground terminal comprises a plurality of elastic arms that are disposed in parallel.

6. The connector according to claim 1, wherein there are a plurality of first ground terminals, and each first ground terminal of the plurality of first ground terminals comprises a support plate and an elastic arm;

the support plate is connected to the first end of the conductive housing, and support plates of the plurality of first ground terminals are connected to form an integrated structure; and the elastic arm is connected to one side of the support plate, and the elastic arm is configured to abut against a second ground terminal of the peer connector.

7. The connector according to claim 6, wherein one side that is of the support plate and that is connected to the elastic arm faces the conductive housing, and the elastic arm extends into the second cavity.

8. The connector according to claim 6, wherein a window is disposed on the support plate, and the window is at a position that is in the first direction and that corresponds to the second cavity.

9. The connector according to claim 6, wherein the first ground terminal comprises a plurality of elastic arms, and the plurality of elastic arms are disposed in parallel or opposite to each other.

10. The connector according to claim 1, wherein one end that is of the elastic arm and that is configured to abut against the second ground terminal of the peer connector is disposed closer to the first end of the conductive housing than to the second end of the conductive housing.

11. The connector according to claim 1, wherein the first cavity penetrates through the conductive housing in the first direction.

12. The connector according to claim 1, wherein the second cavity penetrates through the conductive housing in the first direction, or the second cavity is provided with an opening that corresponds to the first end of the conductive housing.

13. The connector according to claim 1, further comprising an insulation housing, wherein the insulation housing is provided with a mounting slot, and the first end of the conductive housing is disposed in the mounting slot.

14. The connector according to claim 13, wherein an insulation sleeve is disposed on one side that is of the mounting slot and that faces the first end of the conductive housing, and the insulation sleeve extends into the first cavity and sleeves the signal terminal.

15. A connector assembly, comprising a connector and a peer connector, wherein the connector comprises a ground conductive assembly and a lead frame, wherein the ground conductive assembly comprises a conductive housing and a first ground terminal, the conductive housing comprises a first cavity and a second cavity, the conductive housing further comprises a first end and a second end that are opposite to each other in a first direction, the first end of the conductive housing is configured to be connected to a peer connector, and the first ground terminal is disposed at the first end of the conductive housing, extends into the second cavity, is electrically connected to an inner wall of the second cavity, and comprises a support plate and an elastic arm;

the support plate is located in the second cavity and is disposed closer to the first end of the conductive housing than to the second end of the conductive housing;

the elastic arm is disposed on one side of the support plate, and the elastic arm is configured to abut against a second ground terminal, wherein the second ground terminal is of the peer connector;

the lead frame is disposed at the second end of the conductive housing, the lead frame comprises a plurality of signal terminal groups and shield layers arranged on two sides of the plurality of signal terminal groups, each signal terminal group of the plurality of signal terminal groups comprises at least one signal terminal, each shield layer of the shield layers is electrically connected to the conductive housing, and the at least one signal terminal extends into the first cavity and is isolated from an inner wall of the first cavity;

the first direction is an insertion direction of the connector and the peer connector;

the connector is configured to be electrically connected to the peer connector through insertion; and the second cavity accommodates two first ground terminals, elastic arms of the two first ground terminals are disposed opposite to each other, and the elastic arms of the two first ground terminals are configured to clamp the second ground terminal of the peer connector.

16. An electronic device, comprising a first circuit board, a second circuit board, and the connector assembly according to claim 15, wherein the connector of the connector assembly is disposed on the first circuit board and is electrically connected to the first circuit board, and the peer connector of the connector assembly is disposed on the second circuit board and is electrically connected to the second circuit board.

* * * * *